United States Patent
Hyde et al.

(10) Patent No.: US 7,926,344 B1
(45) Date of Patent: Apr. 19, 2011

(54) ULTRASONIC FLUID LEVEL SENSING USING A DRY COUPLANT

(75) Inventors: David D. Hyde, Ontario, NY (US); John A. Reyner, Rochester, NY (US)

(73) Assignee: Ortho-Clinical Diagnostics, Inc., Raritan, NJ (US)

( * ) Notice: Subject to any disclaimer, the term of this patent is extended or adjusted under 35 U.S.C. 154(b) by 460 days.

(21) Appl. No.: 11/959,537

(22) Filed: Dec. 19, 2007

Related U.S. Application Data

(60) Provisional application No. 60/871,029, filed on Dec. 20, 2006.

(51) Int. Cl.
*G01F 23/296* (2006.01)

(52) U.S. Cl. .................. 73/290 V; 73/290 B; 73/290 R; 73/296

(58) Field of Classification Search ................ 73/290 B, 73/290 R, 290 V, 296
See application file for complete search history.

(56) References Cited

U.S. PATENT DOCUMENTS

| | | | |
|---|---|---|---|
| 3,663,842 A * | 5/1972 | Miller | 310/338 |
| 3,698,051 A * | 10/1972 | Miller | 29/25.35 |
| 3,714,816 A * | 2/1973 | Miller | 73/639 |
| 3,853,805 A * | 12/1974 | Miller et al. | 524/500 |
| 4,144,517 A | 3/1979 | Baumoel | |
| 4,480,468 A * | 11/1984 | Sinha | 73/290 V |
| 4,559,827 A * | 12/1985 | Kupperman et al. | 73/644 |
| 4,821,569 A | 4/1989 | Soltz | |
| 4,853,694 A * | 8/1989 | Tomecek | 340/621 |
| 4,901,245 A | 2/1990 | Olson et al. | |
| 5,095,754 A * | 3/1992 | Hsu et al. | 73/602 |
| 5,195,058 A * | 3/1993 | Simon | 367/87 |
| 5,249,466 A * | 10/1993 | Jones | 73/633 |
| 5,303,585 A * | 4/1994 | Lichte | 73/290 V |
| 5,494,038 A | 2/1996 | Wang et al. | |
| 5,691,476 A * | 11/1997 | Madaras | 73/644 |
| 5,730,025 A | 3/1998 | Getman et al. | |
| 5,770,801 A * | 6/1998 | Wang et al. | 73/644 |
| 5,880,364 A | 3/1999 | Dam et al. | |
| 6,397,656 B1 * | 6/2002 | Yamaguchi et al. | 73/1.82 |
| 6,412,344 B1 * | 7/2002 | Danicich et al. | 73/290 V |
| 6,631,639 B1 | 10/2003 | Dam et al. | |
| 6,781,287 B1 | 8/2004 | Dam et al. | |
| 6,832,516 B1 | 12/2004 | Dam et al. | |
| 7,245,059 B2 * | 7/2007 | Lagergren et al. | 310/317 |
| 7,287,425 B2 * | 10/2007 | Lagergren | 73/290 V |
| 7,360,417 B2 * | 4/2008 | Dockendorff et al. | 73/290 R |

(Continued)

FOREIGN PATENT DOCUMENTS

DE 198240482 C1 * 7/1999

(Continued)

OTHER PUBLICATIONS

"SL-730 Series Continuous Level Sensors", Cosense, Inc., Sep. 2006.*

*Primary Examiner* — David A. Rogers

(74) *Attorney, Agent, or Firm* — Todd J. Burns

(57) ABSTRACT

An ultrasonic, non-invasive, bottom-up fluid level sensor for a container, includes: an ultrasonic transducer; and a dry couplant in acoustic communication with the transducer. The dry couplant is configured to adapt to the bottom surface of the container and the sensor contains nothing to bias the sensor against the container other than the weight of the container and fluid.

14 Claims, 3 Drawing Sheets

U.S. PATENT DOCUMENTS

| | | | |
|---|---|---|---|
| 7,454,958 B2 * | 11/2008 | Ellson et al. | 73/61.43 |
| 7,694,560 B1 * | 4/2010 | Dam et al. | 73/290 V |
| 2003/0026733 A1 | 2/2003 | LaCourt et al. | |
| 2004/0123666 A1 | 7/2004 | Ao et al. | |
| 2005/0079103 A1 | 4/2005 | Jacobs | |
| 2005/0196867 A1 | 9/2005 | Bower et al. | |
| 2007/0266789 A1 * | 11/2007 | Hampton et al. | 73/596 |
| 2007/0266790 A1 * | 11/2007 | Gunasekaran et al. | 73/624 |
| 2009/0205419 A1 * | 8/2009 | Volkwein et al. | 73/290 V |

FOREIGN PATENT DOCUMENTS

DE   102004059964 A1 *   6/2006

* cited by examiner

ULTRASONIC FLUID LEVEL SENSING USING A DRY COUPLANT

CROSS REFERENCE TO RELATED APPLICATIONS

This application claims priority from U.S. Provisional Application 60/871,029, filed on Dec. 20, 2006, which is incorporated by reference in its entirety.

BACKGROUND OF THE INVENTION

The present invention relates to ultrasonic fluid level sensing. In particular, the present invention relates to non-invasive ultrasonic fluid level sensing in an automated diagnostic analyzer.

When containers are used to contain a fluid, such as water, it is desirable to know the level or height of fluid in the container in order to determine the volume of fluid remaining in the container. There are many prior art fluid level sensors that determine the level of fluid in a container. However, most existing fluid level sensors are "intrusive," which require a sensor to be located inside the container. Because the intrusive fluid level sensors are located inside the container, the sensors are difficult to mount and may be difficult to access for replacement or repair. Intrusive fluid level sensors are also exposed to the contents of the container and pressure inside the container, which can be hazardous to the sensor, and the sensor may contaminate the contents of the container. Finally, some intrusive fluid level sensors require holes to be drilled in the container, which adds additional time and expense to the mounting procedure, and compromises the integrity of the container.

Non-intrusive fluid level sensors may be used in place of intrusive fluid level sensors. The non-intrusive fluid level sensors may use a transducer to send ultrasonic pulses through the container and detect the reflection of the transmitted pulses (an echo pulse) that is generated when the ultrasonic pulses reach a fluid-air (or fluid-gas) interface in the container. By measuring the elapsed time between the emission of the original pulse and the detection of the reflected pulse, and knowing the speed of travel of the pulses in the container, the level of fluid in the container may be determined.

In order to couple the transducer to the walls of the container such that the transducer can transmit ultrasonic pulses through wall of the container, a couplant must be used. Typically, a "wet" couplant, which is a gel or liquid, is used to couple the transducer to the container wall. However, wet couplants can be difficult to handle and to contain inside the sensor. Wet couplants increase the difficulty of mounting and replacing a non-intrusive level sensor because the wet couplant may tend to leak or escape when the sensor is unassembled. Furthermore, a wet couplant has a natural tendency to lose moisture, and thus may dehydrate or dry out over time. U.S. Pat. No. 6,412,344, which is incorporated by reference in its entirety, discloses sensors including dry couplants. However, these sensors are preferably bonded to the tank or bottle. With the sensor bonded to the tank or bottle a quick exchange between bottles is difficult. An ultrasonic non-invasive sensor, the SL-730 Series, is available from Cosense, Inc., Hauppauge, N.Y.

Known diagnostic analyzers include immunodiagnostic analyzers such as the Vitros® ECi immunodiagnostic analyzer, or clinical chemistry analyzers such as the Vitros® 5,1 FS, both sold by Ortho-Clinical Diagnostics, Inc. All such analyzers are collectively called diagnostic analyzers. Representative systems are disclosed for example in U.S. Published Patent Application No. 2003/0026733, U.S. application Ser. No. 10/684,599 filed Oct. 14, 2003, U.S. Published Patent Application No. 2005/0196867, all of which are incorporated herein by reference in their entireties. Such diagnostic analyzers typically have the need to store onboard the instrument reservoirs that contain fluids that are used in the immunoassay reactions. Usually there is a need for a liquid waste container as well. An accurate volume determination for the amount of fluid in these containers is needed for the scheduling of assays.

Most diagnostic analyzers use a type of level sense method that is invasive such as float switches or similar. Floats are in contact with the liquid in the bottles, and during the changing of the fluids, some of the fluids can come in contact with the person changing the bottles or the instrument. Some analyzers use air pressure to sense the level in the bottles. This method has the drawback of taking quite a bit of time to do the volume determination. An ultrasonic dry couplant such as described in the '344 patent would be desirable, except that such a sensor is biased against the container, such as by a spring.

Depending on use, these bottles have to be often changed. Therefore, it would be desirable to have a level sense system that quickly disengages from the bottles for easy replacement.

SUMMARY OF THE INVENTION

The present invention is directed to an ultrasonic sensor that solves the foregoing problem of biasing a sensor to a container, such as by adhesive or mechanical force.

One aspect of the invention is directed to an ultrasonic, non-invasive, bottom-up fluid level sensor for a container, comprising: an ultrasonic transducer; and a dry couplant in acoustic communication with the transducer, wherein the dry couplant is configured to adapt to the bottom surface of the container; wherein the sensor contains no biasing means to bias the sensor against the container other than the weight of the container and fluid.

Another aspect of the invention provides a method sensing the level of a liquid in a container, comprising: providing a container having fluid therein; providing the ultrasonic, non-invasive, bottom-up fluid level sensor as described above; transmitting a pulse of acoustic energy from the ultrasonic transducer through the dry couplant, the base of the container and into the fluid; detecting a reflected pulse from the fluid gas interface in the container; calculating the amount of fluid in the container based on the time from transmitted to reflected pulse.

Further objects, features and advantages of the present invention will be apparent to those skilled in the art from detailed consideration of the preferred embodiments that follow.

DETAILED DESCRIPTION OF PREFERRED EMBODIMENTS

While the present invention is described with respect to the preferred embodiment of level sensing on a diagnostic analyzer, the invention is applicable to any application where ultrasonic level sensing is necessary.

Figure 1:
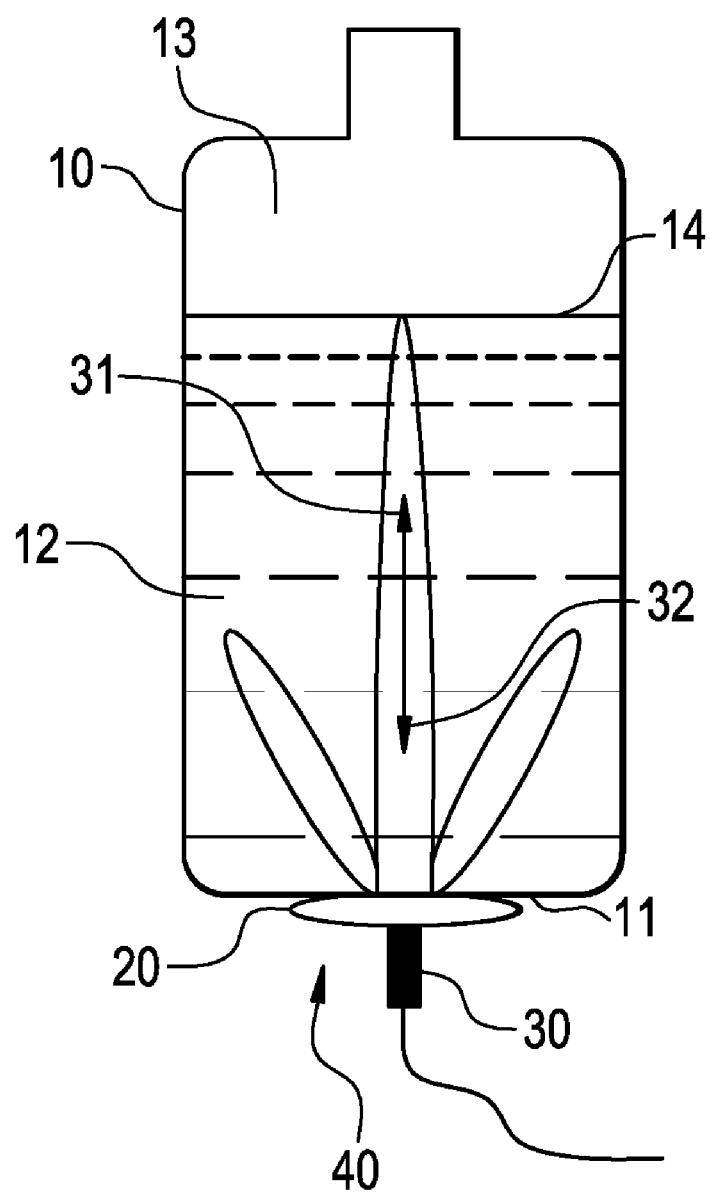
FIG. 1 is a schematic side cross sectional view of the ultrasonic sensor and container according to one embodiment of the present invention.

FIG. 1 is a schematic view of an ultrasonic level sensor 40 that includes an ultrasonic transducer 30 and dry couplant pad 20. Sitting on top of the ultrasonic sensor is a bottle 10. An important feature of the present invention is that the bottle and sensor are not biased against each other with any force other than the weight of the bottle and fluid in the bottle. Prior to the present invention, sensors were generally joined to the container by a biasing pressure, such as 500 psi, which is constant. See, e.g., U.S. Pat. No. 6,412,344. In the present invention, mechanical means such as a bolt and nut, springs, welding, or adhesives are not required to bias the sensor against the bottle.

As noted above, the sensor 40 includes a transducer 30 having a pulse source (not shown) that generates ultrasonic wave pulses (such as ultrasonic pulses) and an echo detector (not shown) that detects ultrasonic wave pulses. As used herein, the term "transducer" refers to a device that is capable of transmitting and/or receiving ultrasonic pulses. The transducer typically uses a piezoelectric element to send out wave pulses and to detect wave pulses. Transducers are typically either "single element" and "array element" transducers. An "single element" transducer has a single ultrasound transducer while an "array element" transducer has a plurality of ultrasound transducers arranged either in a line or in a matrix array. Both single and array type transducers, as well as other types of transducers, can be used in the present invention.

A dry or solid couplant 20 is located between the transducer 30 and the bottle 10. The dry couplant 20 is made of a material that transmits ultrasonic pulses with relatively little loss. The dry couplant 20 acts as a "conductor" to transfer ultrasonic pulses between the transducer 30 and the bottle 10. That is, the dry couplant 20 helps to bridge any impedance mismatch between the face of the transducer 30 and bottle. The dry couplant 20 may be made from a wide variety of materials including, but not limited to, elastomers, rubber, or compliant, encapsulated epoxy materials. The dry couplant 20 is preferably a two-part silicone rubber as described in more detail below.

Figure 2A:
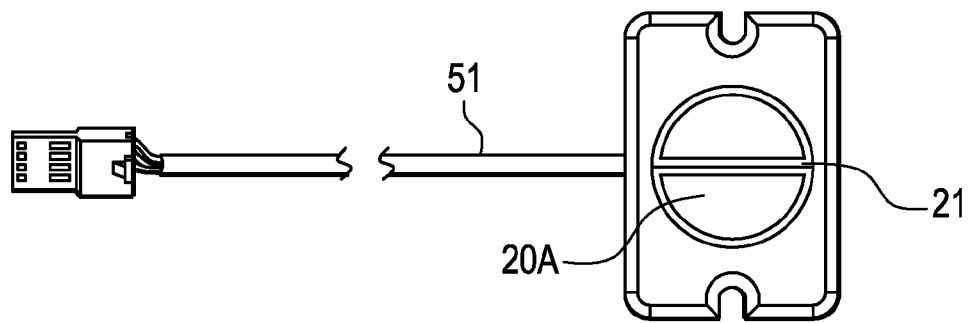
FIGS. 2A-C shows a top view, side view and isometric view, respectively, according to one embodiment of the present invention.
Figure 2B:
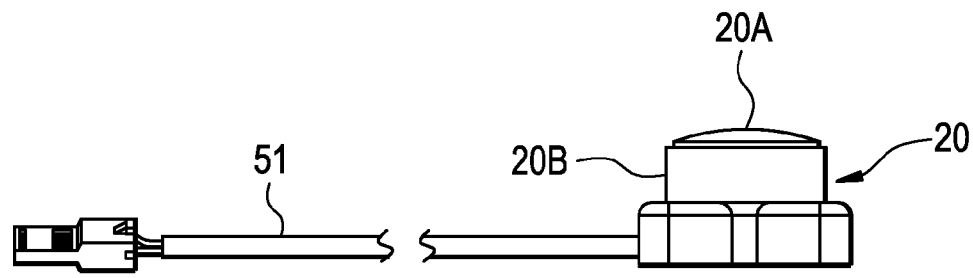
Figure 2C:
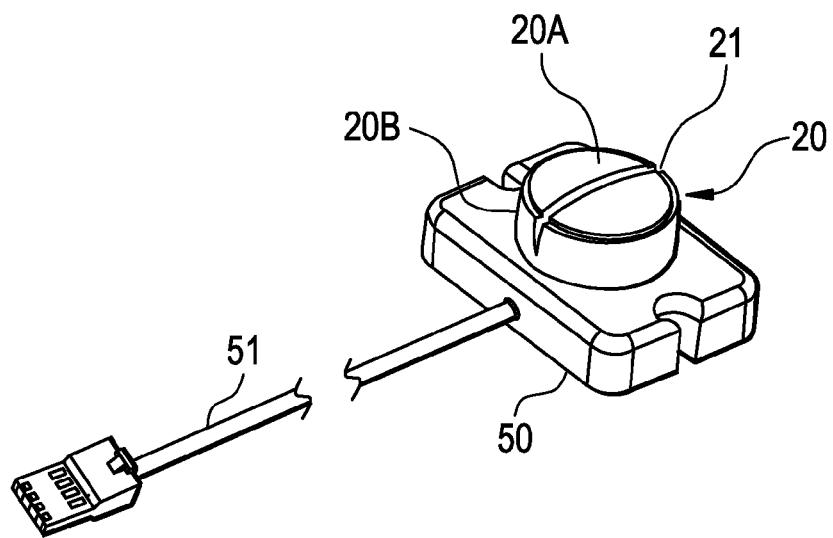

FIG. 2 shows an ultrasonic sensor according to a preferred embodiment of the invention. In FIG. 2, the dry couplant is made of two different type of materials (20A, 20B). Material 20A is preferably a silicone rubber that is softer relative to material 20B. Material 20B is preferably a silicone rubber that is harder relative to material 20A. In the FIG. 2 embodiment, the transducer 30 is contained within material 20B of the dry couplant. The dry couplant has a split that extends into material 20B. This is particularly advantageous in assisting in supporting the bottle and ensuring a satisfactory acoustic communication between the bottle, transducer and couplant.

Also shown in FIG. 2 is mounting base 50 that supports couplant 20. The mounting base includes the ultrasonic transmitting and receiving electronics. These electronics are further in electrical communication with a processor (not shown) via electrical connection 51.

Figure 3A:
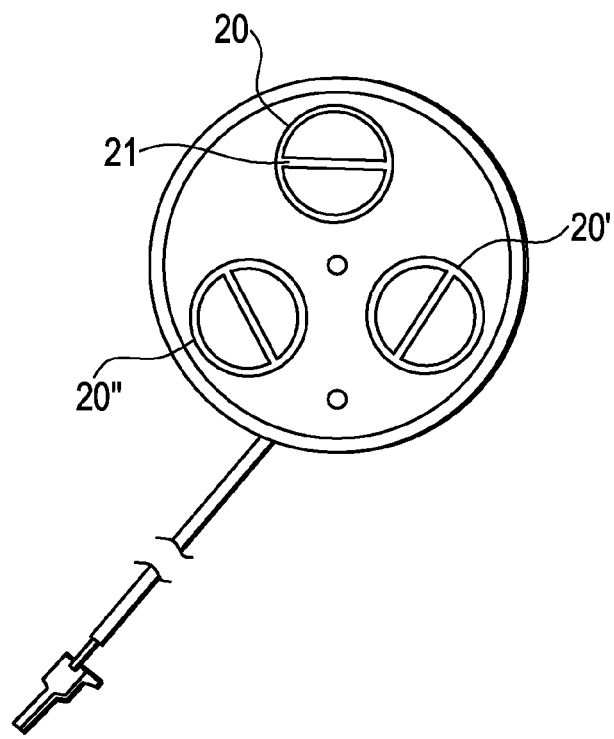
FIGS. 3A-C shows a top view, side view and isometric view, respectively, according to one embodiment of the present invention.
Figure 3B:
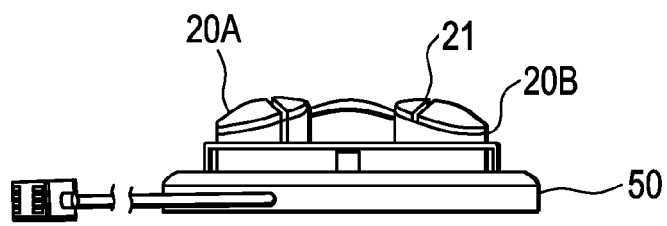
Figure 3C:
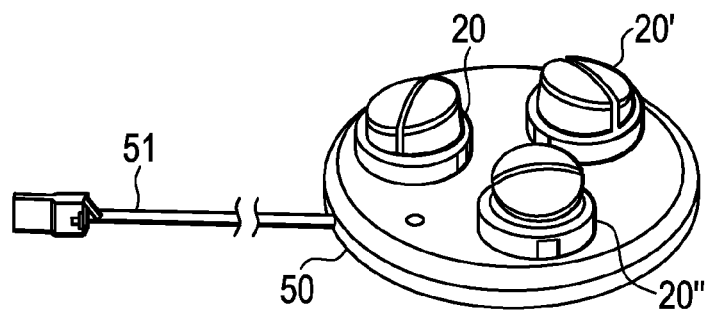

The embodiment shown in FIG. 3 is identical to FIG. 2 except that there are three dry couplants 20, 20', and 20". However only one of these dry couplants contains transducer 30. The other two dry couplants are present for the purposes of holding the bottle 10 in a satisfactory acoustic communication with the dry couplant and transducer. In a preferred embodiment, the bottle used in FIG. 3, has a concave bottom. Therefore, the dry couplants 20, 20' and 20" are at a slight angle to support the bottle. In such an embodiment, the material of the bottle may be PET.

In order to operate the fluid level sensor 40, the container 10 is set on the fluid level sensor 40 as shown in FIG. 1 using only the weight of the bottle to bias the sensor against the container. The transducer 30 is then triggered to transmit a pulse of acoustic energy, preferably at an ultrasonic frequency. When the transducer 30 transmits a pulse, the pulse is transmitted to the dry couplant 20. Because the transducer 30 and dry couplant 20 are in close contact, little energy is lost during transmission of the pulse through those components. Furthermore, as noted earlier, the material of the dry couplant 20 is selected to ensure a high efficiency transfer of the pulse. The transmitted pulse then passes through the wall 11 of the container and enters the fluid 12 in the container (the transmitted pulse is shown schematically as arrow 31 in FIG. 1). The pulse 31 then propagates through the fluid 12 until the fluid-gas interface 14 is reached. Because of the acoustic impedance difference between the gas 13 and the fluid 12, a reflected ultrasonic wave pulse, or "echo" is generated at the fluid-gas interface 15, shown schematically as arrow 32. The echo wave, or acoustic pulse 32 travels in the opposite direction to the pulse 31 transmitted by the transducer 30. The reflected pulse 32 then travels through the fluid 12, and through the wall 11 of the container 10, and the dry couplant 20. The echo pulse 32 is then sensed by the transducer 30.

By measuring the time elapsed from the sending of the pulse 31 to the receipt of the echo 32, and knowing: 1) the speed of travel of the pulses through the fluid 12; 2) optionally the speed of travel of the pulses through the container wall 16, and the thickness of the container wall; and 3) optionally the speed of travel of the pulses through the dry couplant and the thickness of the dry couplant, the height of the fluid 12 in the container 10 can be calculated. The height of the fluid 12 can be calculated by first determining the total elapsed time between the emission of the pulse and the receipt of the echo signal. The time that the pulse and echo take to travel through the container wall 11 is known, or can be calculated by a processor (not shown). The time for the pulses to travel through the container wall 11 is the speed through which a pulse travels through the container wall (empirically known or calculated) multiplied by thickness of the wall (known or measured). The time for the pulses to travel through the dry couplant may also be considered, but due to its relatively thin nature this may generally be disregarded. In a preferred embodiment, both the thickness of the couplant and of the container will be constant and can be calibrated out of the equation to determine the height of the fluid.

Once the time that it takes the transmitted pulse and the echo pulse to travel through the container wall 11 is calculated, that time value is subtracted from the total time from the emission of the transmitted pulse to the detection of the echo pulse. The resultant value is then multiplied by the speed of the travel of the pulses through the fluid 12, and divided by two, to arrive at the height of the fluid in the container 10. The speed of the travel of pulses through the fluid 14 may be programmed into the processor. In one embodiment, the processor simply measures the time elapsed between the emission of the pulse and the detection of the echo. This data is then transferred to an external processor that calculates the height of the fluid, and/or the volume of fluid in the container. In another embodiment, the processor may calculate the height of the fluid 12 and/or the volume of fluid in the container 10. Finally, the processor may be located remotely from the transducer 30. The processor is preferably coupled (e.g., electrically coupled by wires or wirelessly coupled) to the transducer 30 to receive output from the transducer 30.

The ultrasonic sensor as described above is particularly useful with diagnostic analyzers as described above. Using a non-invasive sensor such as ultrasonic transducer that pings the surface of the liquid in the bottle has the advantage of not having any contact with the fluids in the bottle thus avoid cross contamination between bottles due to sensor contamination. Also, the operator is protected from having to come into contact with any fluid, since the ultrasonic sensor is non-invasive. The sensor according to the invention has the ability to know at any given time the volume of the liquid in the bottle.

It will be apparent to those skilled in the art that various modifications and variations can be made to the compounds, compositions and processes of this invention. Thus, it is intended that the present invention cover such modifications and variations, provided they come within the scope of the appended claims and their equivalents.

The disclosure of all publications cited above are expressly incorporated herein by reference in their entireties to the same extent as if each were incorporated by reference individually.

We claim:

1. A combination ultrasonic, non-invasive, bottom-up fluid level sensor and container, comprising:
    a container; and
    an ultrasonic sensor, comprising:
        a mounting base;
        an ultrasonic transducer in electrical communication with the mounting base;
        a dry couplant in acoustic communication with the transducer, wherein the dry couplant is configured to adapt to the bottom surface of the container, and wherein the container sits on top of the sensor and is coupled to the exterior of the container only by the weight of the container and any fluid in the container, wherein the dry couplant is three couplants located equidistant from each other on top of the mounting base.

2. A combination as claimed in claim 1, wherein no adhesive or mechanical means are used to couple the sensor to the container.

3. A combination as claimed in claim 1, wherein the dry couplant is a rubber.

4. A combination as claimed in claim 1, wherein the container is a bottle.

5. A combination as claimed in claim 4, wherein the bottle is a wash-water or liquid waste bottle on a diagnostic analyzer.

6. A combination as claimed in claim 4, wherein the bottle is PET or high density polyethylene.

7. An ultrasonic, non-invasive, bottom-up fluid level sensor for a container, comprising:
    an ultrasonic transducer; and
    a dry couplant in acoustic communication with the transducer, wherein the dry couplant is configured to adapt to the bottom surface of the container;
    wherein the sensor contains no biasing means to bias the sensor against the container other than the weight of the container and fluid, wherein dry couplant is three couplants located equidistant from each other on top of a mounting base.

8. An ultrasonic, non-invasive, bottom-up fluid level sensor as claimed in claim 7, wherein the rubber is silicone.

9. An ultrasonic, non-invasive, bottom-up fluid level sensor as claimed in claim 7, further comprising a mounting base in electrical communication with the ultrasonic transducer.

10. An ultrasonic, non-invasive, bottom-up fluid level sensor for a container, comprising:
    an ultrasonic transducer; and
    a dry couplant in acoustic communication with the transducer, wherein the dry couplant is configured to adapt to the bottom surface of the container;
    wherein the sensor contains no biasing means to bias the sensor against the container other than the weight of the container and fluid, wherein the dry couplant further comprises a top portion and a bottom portion, the top portion having a softness greater than the bottom portion, and wherein ultrasonic transducer is located within the bottom portion.

11. An ultrasonic, non-invasive, bottom-up fluid level sensor as claimed in claim 10, further comprising a mounting base in electrical communication with the ultrasonic transducer.

12. An ultrasonic, non-invasive, bottom-up fluid level sensor as claimed in claim 11, wherein the top and bottom portion comprise silicone rubber having two different hardness.

13. A method sensing the level of a liquid in a container, comprising:
    providing the container having fluid therein and the ultrasonic, non-invasive, bottom-up fluid level sensor according to claim 1;
    transmitting a pulse of acoustic energy from the ultrasonic transducer through the dry couplant, the base of the container and into the fluid;
    detecting a reflected pulse from the fluid gas interface in the container;
    calculating the amount of fluid in the container based on the time from transmitted to reflected pulse.

14. A method sensing the level of a liquid in a container as claimed in claim 13, wherein the step of calculating further comprises including the thickness of the container wall and the thickness of the dry couplant, and the dimensions of the container.

* * * * *